United States Patent
Wuester, Sr. et al.

[11] Patent Number: 5,978,175
[45] Date of Patent: Nov. 2, 1999

[54] HYDRODYNAMIC BEARING ARRANGEMENT HAVING A STRUCTURE PERMITTING THE REMOVAL OF ENTRAPPED AIR

[75] Inventors: David Wuester, Sr., Santa Cruz; Roger Addy, Gilroy, both of Calif.

[73] Assignee: Seagate Technology, Inc., Scotts Valley, Calif.

[21] Appl. No.: 09/035,662

[22] Filed: Mar. 5, 1998

Related U.S. Application Data

[60] Provisional application No. 60/040,361, Mar. 13, 1997, abandoned.

[51] Int. Cl.$^6$ ........................................... G11B 17/02
[52] U.S. Cl. ................................................. 360/99.08
[58] Field of Search ........................ 360/99.08, 99.04, 360/98.07; 384/107, 112, 121–124

[56] References Cited

U.S. PATENT DOCUMENTS 5,694,268  12/1997  Dunfield et al. .................... 360/98.07

*Primary Examiner*—Robert S. Tupper
*Attorney, Agent, or Firm*—LaRiviere, Grubman & Payne, LLP

[57] ABSTRACT

Air which would otherwise be entrapped in an O-ring seal groove in a hydrodynamic bearing arrangement is removable from the seal groove by providing at least one passage between the seal groove and an adjacent thrust plate recess. The air is removed from the seal groove though the passages by drawing a vacuum at a lower end of the bearing arrangement. Preferably, the passages are formed, at least in part, by grooves defined in the upper surface of a land formed between the seal groove and the thrust plate recess. A method of forming the grooves is also disclosed.

16 Claims, 3 Drawing Sheets

HYDRODYNAMIC BEARING ARRANGEMENT HAVING A STRUCTURE PERMITTING THE REMOVAL OF ENTRAPPED AIR

RELATED APPLICATIONS

This application claims the benefit of U.S. Provisional Patent Application No. 60/040,361 filed Mar. 13, 1997, abandoned.

TECHNICAL FIELD

The present invention relates to, but is not limited to, the configuration of a hydrodynamic thrust bearing for use in a computer hard disc drive spindle motor assembly.

BACKGROUND OF THE INVENTION

Computer hard disc drives generally comprise an array of magnetic discs mounted to a spindle motor assembly. Data is written to, and read from, each magnetic disc by means of a read/write head located at the end of an arm which extends between the discs. Positioning of the arm is accomplished by means of a voice coil motor under the control of disc drive control electronics.

The array of magnetic discs is mounted to a hub of the spindle motor assembly. The hub is mounted for rotation with respect to a base of the spindle motor assembly by means of a bearing arrangement. In use, the hub is rotated by means of an electromagnetic motor. The bearing arrangement is expected to have a long, maintenance-free service life. In this regard, the amount of bearing fluid in the hydrodynamic bearing is chosen carefully; if there is too much bearing fluid in the bearing arrangement, some of it may leak out and contaminate other areas of the disc drive, while too little bearing fluid may result in the bearing arrangement seizing.

If the correct amount of bearing fluid is provided, it is important to ensure that leakage of bearing fluid from the bearing arrangement over the life of the motor is minimized. Any such leakage will have the consequence firstly of potentially contaminating the disc drive and secondly, of reducing the amount of bearing fluid below the ideal amount, potentially causing bearing arrangement failure.

Accordingly, it would be desirable to have a hydrodynamic bearing configuration in which bearing fluid leakage is reduced.

SUMMARY OF THE INVENTION

According to the invention there is provided a hydrodynamic bearing arrangement comprising:
 a journal defining a journal bore and defining a recess at an end of the journal bore for receiving a thrust plate, the journal further defining a land around the recess and defining a seal groove around the land for receiving a seal;
 a shaft mounted in the journal bore;
 a thrust plate extending transversely from the shaft and being located in the recess defined by the journal;
 a seal located in the seal groove; and
 a counter plate mounted to the journal in abutting relationship with the seal and a surface of the land, and being located adjacent to the thrust plate, the bearing arrangement having a passage defined therein between the recess and the seal groove, for permitting the removal of air from the seal groove to the recess.

Also according to the invention there is provided a hydrodynamic bearing journal for a computer disc drive, the journal defining:
 a journal bore for receiving a shaft;
 a recess at an end of the journal bore for receiving a thrust plate;
 a land around the recess, the land having an upper surface against which a counter plate abuts in use; and
 a seal groove around the land for receiving a seal;
 wherein the upper surface of the land has a groove defined therein for permitting the removal of any from the seal groove to the recess after assembly of the counter plate to the journal.

Further according to the invention there is provided a method of manufacturing a hydrodynamic bearing journal comprising the steps of:
 forming a recess in one end of the journal for receiving a thrust plate;
 forming a land around the recess, the land having an upper surface against which a counter plate abuts in use;
 forming a seal groove around the land, for receiving a seal; and
 forming a groove in the upper surface of the land for permitting the removal of air from the seal groove to the recess after assembly of the counter plate to the journal.

Preferably, the forming steps are performed by turning the journal in a lathe, and the step of forming the groove in the upper surface of the land comprises the steps of:
 rotating the journal in a chuck of the lathe;
 positioning a cutting tool adjacent to the upper surface of the land with a cutting portion of the tool located below the surface of the land; and
 traversing the cutting tool across the land to form the groove in a spiral shape in the upper surface of the land.

Other features of the present invention, as well as the advantages of providing a means for removing air from the seal groove, are disclosed or apparent in the section entitled: "BEST MODE FOR CARRYING OUT THE INVENTION."

BRIEF DESCRIPTION OF TEE DRAWINGS

For fuller understanding of the present invention, reference is made to the accompanying drawings in the following detailed description of the Best Mode of Carrying Out the Present Invention. In the drawings.

Figure 1:
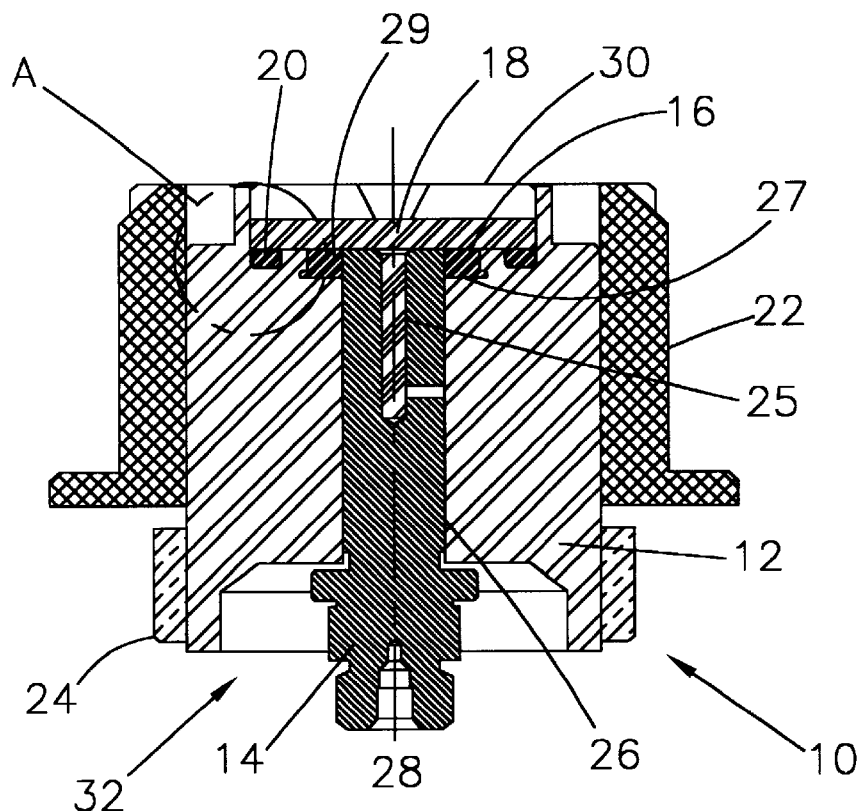
FIG. 1 is a longitudinal cross section through a bearing arrangement according to the invention.
Figure 2:
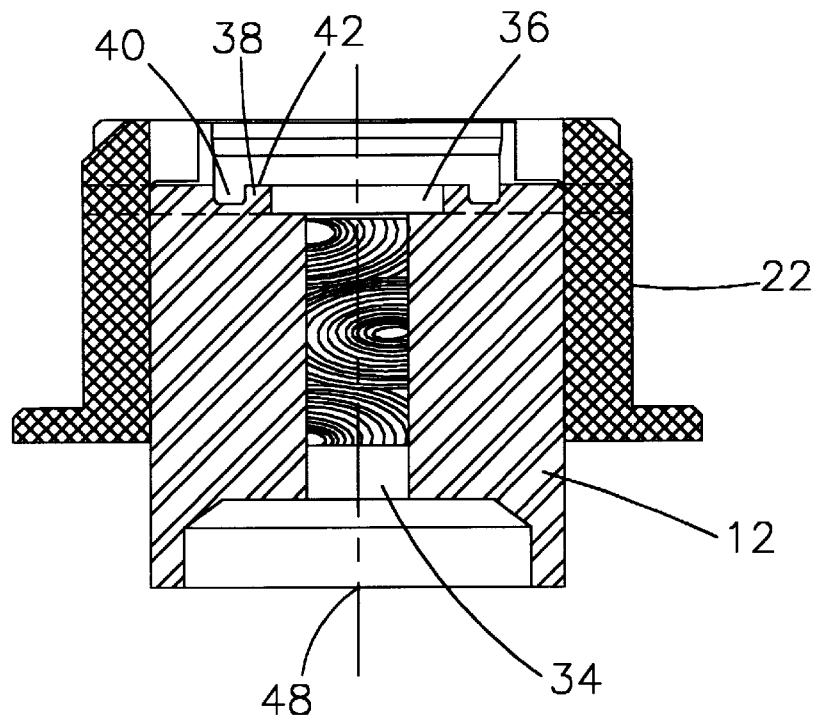
FIG. 2 is a longitudinal cross section though the journal and the hub sleeve of the bearing arrangement of FIG. 1.
Figure 3:
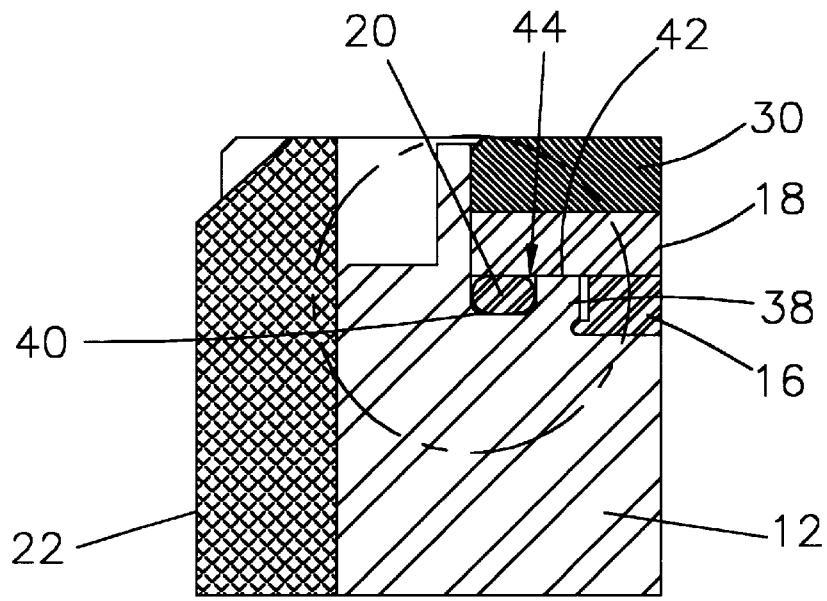
FIG. 3 is an enlarged view of the circled area marked with an "A" in FIG. 1.
Figure 5:
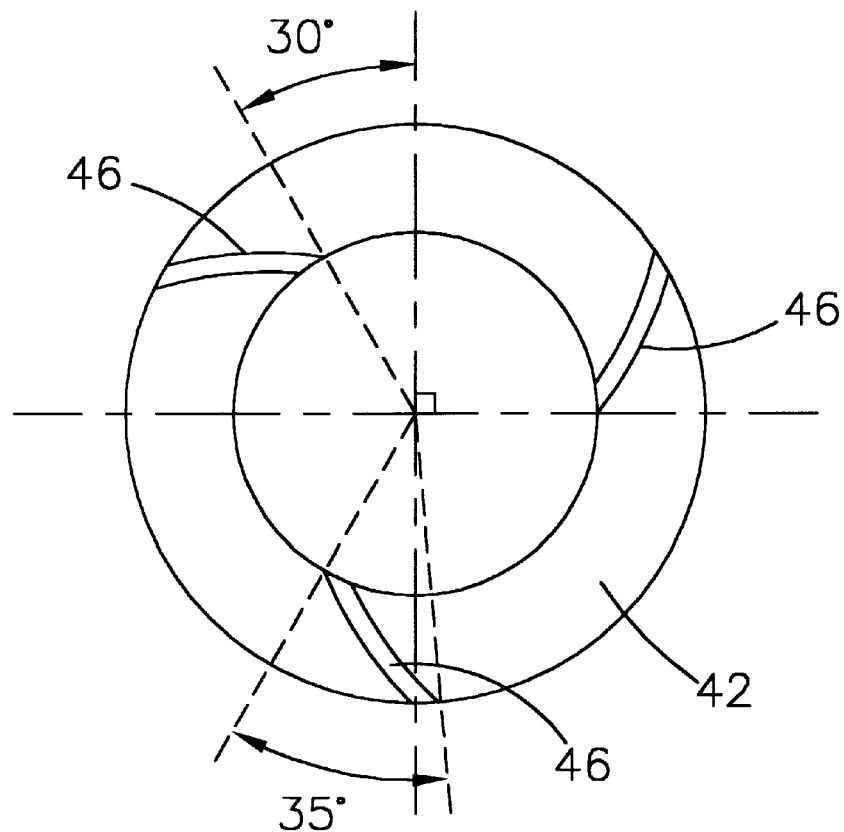
Figure 6:

FIG. 5. is a view of the upper surface of the land between the thrust plate recess and the O-ring groove, in the bearing arrangement illustrated in FIGS. 1 to 3;

FIG. 6 is a transverse cross section through a groove formed in the upper surface of the land illustrated in FIG. 5.

BEST MODE FOR CARRYING OUT THE INVENTION

As hard disc drives and spindle motors are both well-known in the art, in order to avoid confusion while enabling those skilled in the art to practice the claimed invention, this specification omits many details with respect to known items.

FIG. 1 illustrates a cross section through a hub assembly incorporating a hydrodynamic thrust bearing according to the invention. The hub assembly is for use in a spindle motor for a computer hard disc drive. The hub assembly, generally indicated by the numeral 10, comprises a journal 12, a shaft 14, a thrust plate 16, a counter plate 18, an O-ring seal 20, a hub sleeve 22 and a permanent magnet 24.

The shaft 14 is mounted in use at its lower end to a base (not shown) by means of a nut (not shown), and has a bearing fluid return path 25 defined in the upper end thereof. The outer surface of the shaft 14 and the adjacent bore of the journal 12 together form a hydrodynamic journal bearing 26. The hydrodynamic journal bearing 26 includes a grooved surface defined in the bore of the journal 12. The journal bearing 26 supports the journal 12 for rotation relative to the shaft 14 about axis 28.

The thrust plate 16 is press-fitted to one end of the shaft 14 and extends transversely to the shaft 14. The thrust plate 16 defines a first thrust surface which, together with an adjacent thrust surface on the journal 12, defines a first hydrodynamic thrust bearing 27.

The counter plate 18 is press-fitted to the journal 12 adjacent to the thrust plate 16. The counter plate 18 defines a counter plate thrust surface which, together with an adjacent thrust surface defined by the thrust plate 16, forms a second hydrodynamic thrust bearing 29. The counter plate 18 is sealed to the journal 12 by means of the O-ring 20 which is located in a groove defined by the journal.

The first and second hydrodynamic thrust bearings 27, 29 each include grooved bearing surfaces which, upon rotation of the shaft 14 and the thrust plate 16 relative to the journal 12 and the counter plate 18 generate pressure distributions across the first and second hydrodynamic bearings 27, 29. The first and second thrust bearings 27, 29 serve to prevent movement of the journal 12 relative to the shaft 14 along the axis 28.

In this embodiment of the hydrodynamic bearing arrangement, the grooved surfaces of the first and second thrust bearings 27, 29 are provided on the thrust plate 16. They could however alternatively be provided on the counter plate 18 and/or the adjacent surface of the journal 12.

The hub sleeve 22 is fitted around the journal 12, and in use supports an array of magnetic discs (not shown).

In use, the journal 12, the counter plate 18 and the hub sleeve 22 are rotated with respect to the shaft 14, the thrust plate 16 and the base (not shown) by means of an electromagnetic motor. The electromagnetic motor comprises a stator assembly (not shown) mounted to the base, in combination with the magnet 24 which is mounted to the journal 12.

A fixturing plate 30 is mounted to the journal 12 adjacent to the counter plate 18. The fixturing plate 30 has a tapered hole defined therein, which is used for alignment purposes when the array of magnetic discs is mounted onto the hub sleeve 22.

When the hydrodynamic bearing gaps defined by the adjacent surfaces of the journal 12, the shaft 14, the thrust plate 16 and the counter plate 18 are to be filled with bearing fluid, a vacuum is drawn around the lower end 32 of the hub assembly 10. This vacuum draws the air out of the bearing gaps defined between the bearing surfaces. The lower end 32 of the hub assembly 10 is then immersed in bearing fluid, and the surrounding pressure is returned to atmospheric pressure. The vacuum in the bearing gaps then draws the bearing fluid into the bearing gaps.

Referring now to FIG. 2, which shows only the journal 12 and the hub sleeve 22 in longitudinal cross sectional view, the journal 12 can be seen to define a journal bore 34 for receiving the shaft 14. The journal 12 further defines a recess or thrust plate cavity 36 at an end of the journal bore 34 for receiving the thrust plate 16. A land 38 is defined around the recess 36, and a seal groove 40 is defined around the land 38 for receiving the O-ring seal 20.

As will be appreciated from FIGS. 1 and 2, the counter plate 18 is mounted to the journal 12 in abutting relationship with the O-ring seal 20 and an upper surface 42 of the land 38.

FIG. 3 is an enlarged view of the circled area marked with an "A" in FIG. 1. As can be seen from this Figure, the end of the bearing arrangement at which the thrust plate 16 is located is sealed by means of the counter plate 18 abutting against the O-ring seal 20. The O-ring seal 20 does however not fill the groove 40 completely, and an open space 44 is defined between the O-ring seal 20, the counter plate 18, and the outer surface of the land 38.

During assembly of the bearing arrangement 10, air is located in the space 44. To permit this air to be removed from the space 44, at least one passage is defined in the bearing arrangement between the groove 40 and the thrust plate recess 36.

Figure 4:
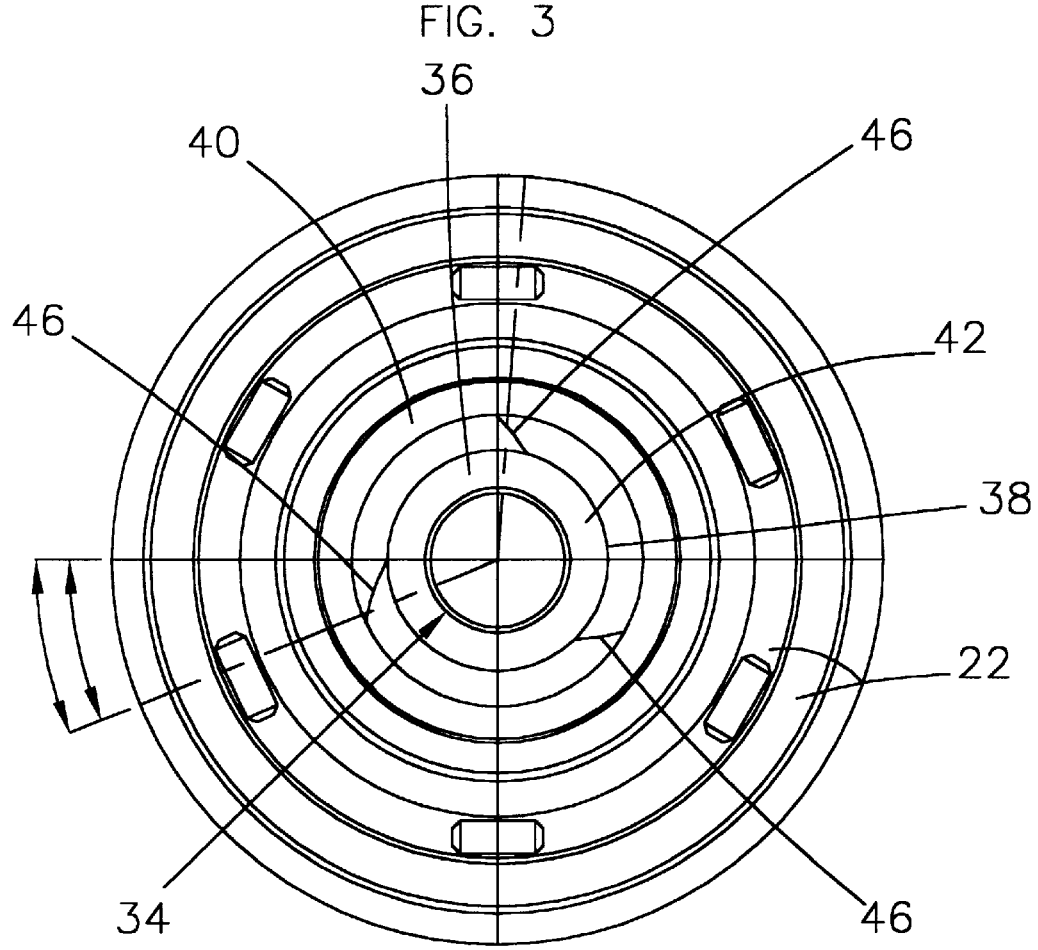
FIG. 4 is a top view of the journal and hub sleeve illustrated in FIG. 2.

Referring now to FIG. 4, which is a top view of the journal 12 as illustrated in FIG. 2, in the best mode embodiment, three grooves 46 are provided in the upper surface 42 of the land 38. The grooves 46, together with the adjacent surface of the counter plate 18, form three passages in the bearing arrangement. The configuration of the grooves 46 will be described in more detail below.

In the absence of a passage between the groove 40 and the thrust plate recess 36, the air would be entrapped in the space 44, as a result of a moderately good natural seal formed between the upper surface 42 of the land 38, and the adjacent surface of the counter plate 18. This seal results from the fact that both of these surfaces are very flat.

Applicants have determined that, in a bearing arrangement without passages or grooves 46 between the groove 40 and the thrust plate recess 36, the air in the space 44 escapes too slowly to be removed completely when a vacuum is drawn during the bearing fluid fill described above.

The air remaining in the space 44 after the bearing fluid fill then expands when the bearing arrangement becomes warm during operation. This expansion causes a slow migration of air from the space 44 to the thrust plate recess 36. The air which has escaped from the space 44 in this manner then locates at the various bearing surfaces.

When the bearing arrangement cools, the remaining air in the space 44 will contract, slowly sucking bearing fluid into the space 44 from the thrust plate recess 36.

This "pumping" action may continue until all the air has been displaced from the space 44 to the bearing surfaces.

As a consequence of this action, firstly, the amount of bearing fluid available at the bearing surfaces is reduced, and secondly, unwanted air will be present at the bearing surfaces. Both of these conditions will adversely affect the length of the operating life of a bearing arrangement, as well as the reliability of the bearing arrangement.

In the bearing arrangement of the invention, the passages between the space 44 and the thrust plate recess 36 permit the air to be removed from the space 44 when the vacuum is drawn at the end 34 during bearing fluid fill, as described above. Then, when the lower end 32 of the hub assembly 10 is immersed in bearing fluid, the vacuum in the bearing arrangement will draw the bearing fluid into the bearing gaps as well as the space 44. The pocket of entrapped air in the space 44 is thus eliminated, solving the problems associated therewith.

The upper surface 42 of the land 38 is shown in more detail in FIG. 5. As can be seen from the figure, three spiral shaped grooves are defined in the surface 42. The grooves 46 are spaced equidistantly from one another at 120° intervals, to provide uniformly distributed pathways for the air to leave the space 44. Each groove 46 occupies an arc of approximately 35° of the circumference of the surface 42. The spiral shape of the grooves results from the method of forming the grooves, which will be discussed in more detail below.

A cross section of one of the grooves 44 is shown in FIG. 6. As can be seen from the figure, each groove has a non-rectangular, rounded cross sectional shape. The grooves do not have a rectangular shape because the machining of a rectangular groove tends to cause burring at the upper edge of the groove, which would violate the flatness requirements of the surface 42, or would require additional finishing steps.

In the illustrated best mode embodiment, each groove defines a circular arc in cross section, of radius 0.2±0.1 mm, with depth of 0.005 to 0.02 mm.

The grooves 46 are formed in the surface 42 during machining of the journal 12 in a CNC (computer numerically controlled) lathe. The journal 12 is held in a chuck of the lathe, and is rotated about its longitudinal axis 48 (see FIG. 2). After the turning of the thrust plate recess 36, the groove 40 and the land 38 with its upper surface 42, the CNC lathe positions a boring and facing tool adjacent to the land 38 at the thrust plate recess 36, with the rounded tip of the tool located below the upper surface 42 of the land 38, to a depth equal to the desired depth of the groove 46.

The tool is then moved in a radial direction from the thrust plate recess 36 to the seal groove 40, traversing the land 38 to cut the groove 46. The combination of the rotational movement of the journal 12, and the linear movement of the boring and facing tool results in the spiral shape of the groove as seen in plan view. The tool is then withdrawn to above the upper surface 42 of the land 38, and repositioned at the thrust plate recess with the tip of the tool located below the upper surface 42 of the land 38.

The radial cutting movement is then repeated at a 120° interval from the first groove, to form the second groove 46, the tool is withdrawn and repositioned again, and the radial cutting movement is then repeated at a 120° interval from the second groove, to form the third groove 46.

By way of example only, during the formation of the grooves 46, the journal 12 is incrementally rotated to produce the geometry herein described while the boring and facing tool traverses the land 38 at a peak feed rate of 1000 cm/minute.

By forming the grooves 46 as part of the machining process of the journal, additional tools or equipment are not required. Also, only a minor modification to the CNC program is required to define the tool movements used to form the grooves. Further, as the boring and facing tool is used to form the grooves, no tool changes are required from the existing setup used to manufacture the journal. Finally, the relatively simple tool movements can be accomplished rapidly.

All these advantages result in a very small additional manufacturing cycle time of approximately 2 seconds per journal.

Also, as mentioned before, the use of a rounded tool to form the grooves 46 reduces burring, because there is no right angle transition between the groove 46 and the flat part of the surface 42.

It will be appreciated that the invention is not limited to the embodiment of the invention described above, and many modifications are possible without departing from the spirit and the scope of the invention.

What is claimed is:

1. A disc drive comprising a disc, a base and connected to the disc and the base, means for fluidically coupling the disc to the base to achieve rotation of the disc relative to the base, wherein said means for fluidically coupling the disc to the base comprises a hydrodynamic bearing arrangement including:

a journal defining a journal bore and defining a recess at an end of the journal bore for receiving a thrust plate, the journal including a land around the recess, a seal groove being defined around the land for receiving a seal;

a shaft mounted in the journal bore;

a thrust plate extending transversely from the shaft and being located in the recess defined by the journal;

a seal located in the seal groove; and a counter plate being mounted to the journal in abutting relationship with the seal and surface of the land, and being located adjacent to the thrust plate, the bearing arrangement having a passage defined therein between the recess and the seal groove, for permitting the removal of air from the seal groove to the recess.

2. The disc drive according to claim 1 wherein the passage is defined at least in part as a groove formed in the surface of the land against which the counter plate abuts.

3. The disc drive according to claim 2 wherein the groove defined in the upper surface of the land has a non-rectangular cross section.

4. The disc drive according to claim 3 wherein the groove defined in the upper surface of the land has spiral shape in plan view.

5. The disc drive according to claim 1 wherein there are at least two equidistantly spaced spiral grooves formed in the surface of the land against which the counter plate abuts.

6. The disc drive according to claim 5 wherein the grooves defined in the upper surface of the land have a rounded cross section.

7. The disc drive according to claim 6 wherein the grooves defined in the upper surface of the land define circular arcs in cross sectional view.

8. The disc drive according to claim 7 wherein the circular arcs have a radius of 0.2±0.1 mm.

9. The disc drive according to claim 7 wherein the grooves defined in the upper surface of the land have a depth of between 0.005 mm and 0.02 mm.

10. A hydrodynamic bearing journal for a computer disc drive, the journal defining:

a journal bore for receiving a shaft;

a recess at an end of the journal bore for receiving a thrust plate;

a land around the recess, the land having an upper surface against which a counter plate abuts in use; and a seal groove around the land for receiving a seal;

wherein the upper surface of the land has a groove defined therein extending from the recess to the seal groove for permitting the removal of any air from the seal groove to the recess after assembly of the counter plate to the journal.

11. A hydrodynamic bearing journal according to claim 10 wherein the groove defined in the upper surface of the land has spiral shape in plan view.

12. A hydrodynamic bearing journal according to claim 10 wherein there are at least two equidistantly spaced spiral grooves formed in the surface of the land against which the counter plate abuts.

13. A hydrodynamic bearing journal according to claim 10 wherein the groove defined in the upper surface of the land has a rounded cross section.

14. A hydrodynamic bearing journal according to claim 12 wherein the grooves defined in the upper surface of the land define circular arcs in cross sectional view.

15. A hydrodynamic bearing journal according to claim 14 wherein the circular arcs have a radius of 0.2±0.1 mm.

16. A hydrodynamic bearing journal according to claim 15 wherein the grooves defined in the upper surface of the land have a depth of between 0.005 mm and 0.02 mm.

* * * * *